United States Patent [19]

Bannick

[11] Patent Number: 5,318,280
[45] Date of Patent: Jun. 7, 1994

[54] RETORT WALL CONSTRUCTION
[75] Inventor: David E. Bannick, Roseville, Minn.
[73] Assignee: BGK Finishing Systems, Inc., Minneapolis, Minn.
[21] Appl. No.: 997,090
[22] Filed: Dec. 29, 1992
[51] Int. Cl.$^5$ .............................................. C21B 7/04
[52] U.S. Cl. .................................. 266/285; 266/286
[58] Field of Search ................. 266/280, 282, 285, 286

[56] References Cited

U.S. PATENT DOCUMENTS 3,358,986  12/1967  Anderson et al. ................. 266/282
4,316,603  2/1982  Steffen ................................. 266/282

*Primary Examiner*—Scott Kastler
*Attorney, Agent, or Firm*—Merchant, Gould, Smith, Edell, Welter & Schmidt

[57] ABSTRACT

A retort for a fluidized bed is disclosed having a retort wall including an outer wall segment and an inner wall segment. The inner wall segment includes a plurality of plate segments. A support mechanism is provided for securing the plurality of plate segments to an inner side of the outer wall. The plate segments are disposed spaced from the outer wall. The plate segments are further disposed in sliding overlapping relation to permit independent thermal expansion and contraction of the plate segments.

9 Claims, 4 Drawing Sheets

RETORT WALL CONSTRUCTION

I. BACKGROUND OF THE INVENTION

1. Field of the Invention

This invention pertains to retorts for fluidized beds. More particularly, this invention pertains to a novel construction of a retort wall.

2. Description of the Prior Art

In the prior art, fluidized bed heat treatment is well known. Such heat treatment consists of fluidizing a bed of particulate material within a retort. The retort is commonly a vessel of stainless steel or the like.

One design of a retort is shown in commonly assigned and copending U.S. patent application Ser. No. 07/924,399. That patent application shows a stainless steel retort with infrared heating assemblies extending between the retort walls and submerged within a bed of fluidized particles. The infrared heating element assemblies of the prior art apparatus included a quartz tube which extends through opposing side walls of the retort. An infrared lamp is positioned concentrically within the tube.

Fluidized beds are also shown in U.S. Pat. Nos. 4,340,433 and 4,392,814 as reference items 10 in the drawings of those patents. As shown in U.S. Pat. No. 4,340,433, the retort 10 has an inner container which includes a corrugated side wall 12.

In practice, construction of a retort for a fluidized bed presents substantial fabrication problems. For example, during heat-up and operation of a fluidized bed, substantial temperatures are reached within the bed. This can result in significant thermal stresses and deformation in the retort wall. Further, in the aforementioned prior art apparatus quartz tubes are passed through the corrugated wall or other nonflat surfaces. The quartz tubes would pass through the corrugated wall. It is difficult to seal a quartz tube against such a nonflat surface.

It is an object of the present invention to provide a retort wall construction which overcomes the disadvantages of the prior art.

II. SUMMARY OF THE INVENTION

According to a preferred embodiment of the present invention a retort for a fluidized bed is provided having a wall which defines a retort interior. The wall comprises an outer shell having an inner side opposing and defining the interior. The inner wall includes a plurality of plate segments. A support mechanism is provided to secure the plurality of plate segments to the inner side with the plate segments disposed spaced from the outer wall and with the plate segments further disposed in sliding overlapping relation. As a result, the plate segments cooperate to define a substantially continuous inner wall with each segment free to thermally expand and contract independent of an expansion or contraction of a contiguous plate segment.

III. BRIEF DESCRIPTION - THE DRAWINGS

IV. DESCRIPTION OF THE PREFERRED EMBODIMENT

Figure 1:
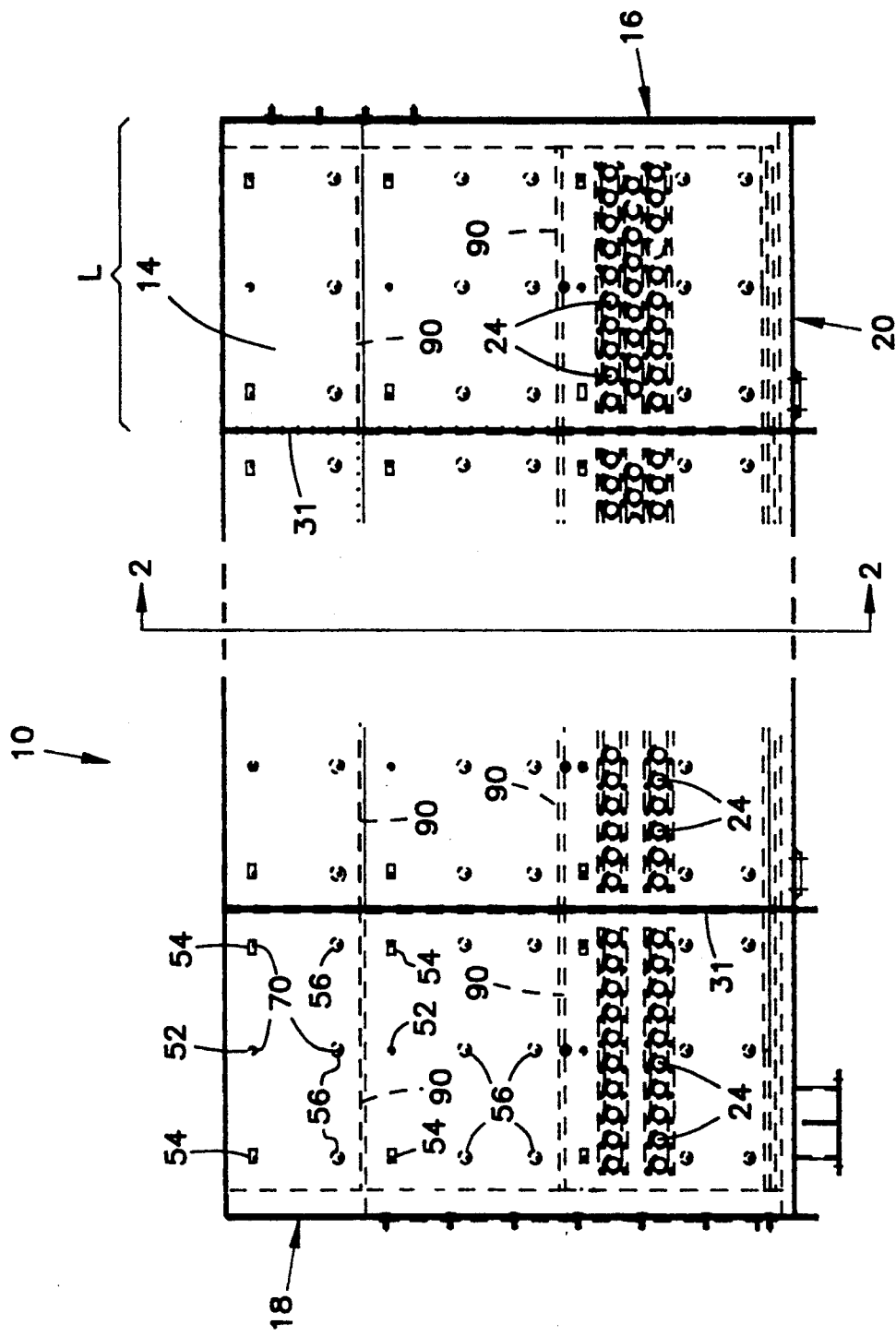
FIG. 1 is a side elevation view of a retort according to the present invention.

With reference now to the various drawing figures in which identical elements are numbered identically throughout, a description of the preferred embodiment of the present invention will now be provided.

In the drawings, a retort 10 is shown. Retort 10 is an open container which includes side walls 12 and 14, end walls 16 and 18, and bottom wall 20. The walls 12,14,16,18 and 20 cooperate to define a retort interior 22. Inlets and outlets (not shown) permit input and discharge of particulate material.

The retort shown in the figures is intended for use in an application such as that shown and described in U.S. patent application Ser. No. 07/924,399. In that application, a plurality of infrared heating lamp assemblies are submerged within a fluidized bed contained within the interior 22. The assemblies would include quartz conduits which extend through the retort walls 12,14. In FIG. 1, holes 24 are shown in wall 14 to permit passage of quartz tubes through the wall 14.

The present invention pertains to a method of construction for the walls 12,14 of the retort 10. The construction technique is best shown with initial reference to FIG. 2.

Figure 2:
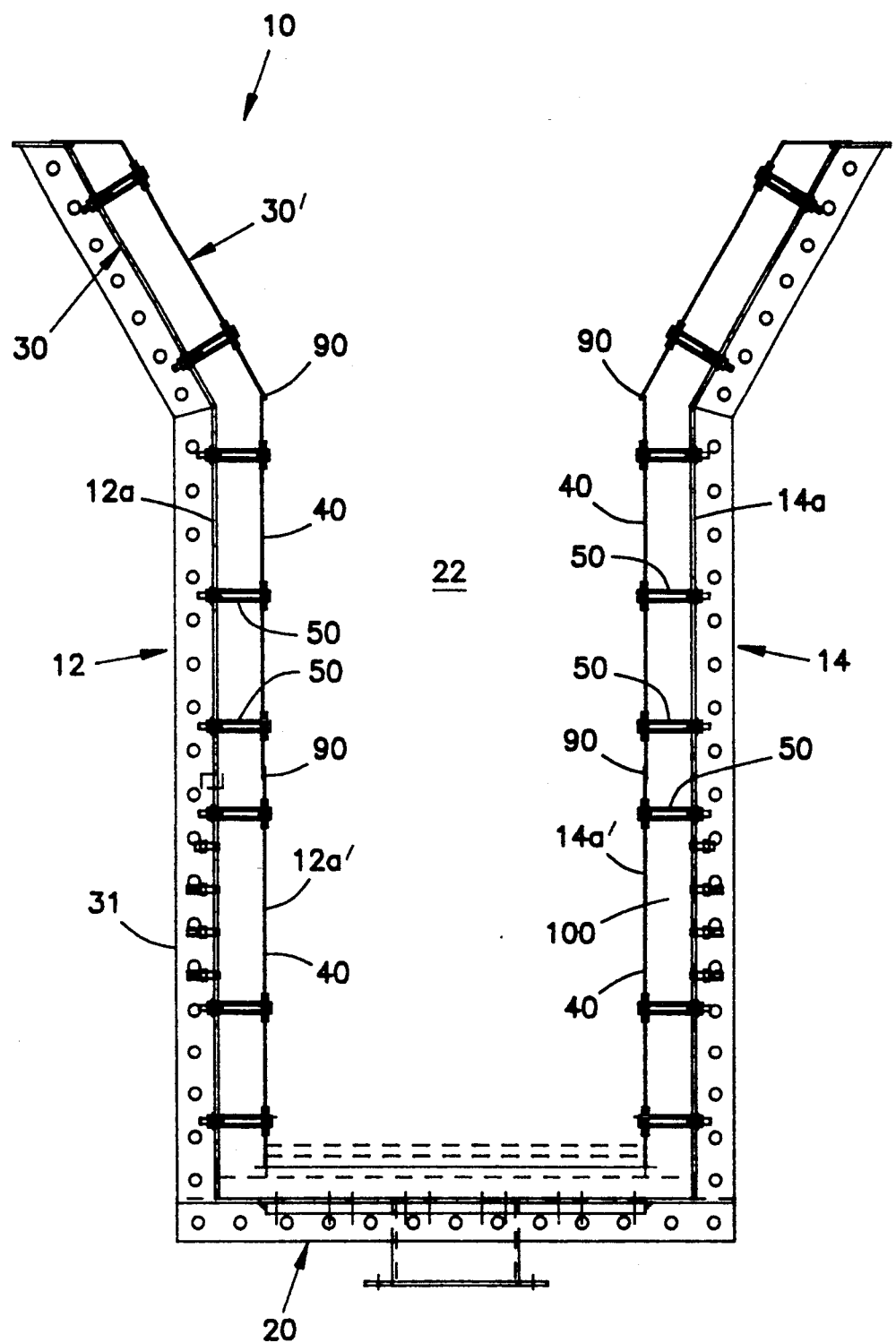
FIG. 2 is a view taken along line 2—2 of the view of FIG. 1.

As shown in FIG. 2, the retort 10 includes an outer shell 30. In the view of FIG. 2, outer shell 30 is shown as including a first outer wall portion 12a, and second outer side wall portion 14a. The outer shell 30 is preferably formed of mild steel bolted together (e.g., at flanges 31) to form a completely fabricated shell 30. With the construction described, a module retort can be constructed. Each length, L, between flanges 31 is a unit of modular length. A retort of any multiple of the modular length can be fabricated.

An inner shell 30' is provided including inner shell side walls 12a',14a'. As shown best in FIG. 2, inner shell walls 12a',14a' are disposed parallel to and spaced from outer shell walls 12a,14a. Each of the inner shell walls 12a',14a' are formed from a plurality of plate segments 40. A description of plate segments 40 will be forthcoming.

Walls 12a',14a' are identical and a description of one will suffice as a description of the other.

Wall 14a' consists of a plurality of the plate segments 40. Each of the plate segments 40 is disposed spaced from and parallel to the outer wall 14a with the plate segments 40 sized to be in sliding overlapping relation to one another. Supports 50 maintain the plate segments in the desired position.

Figure 3:
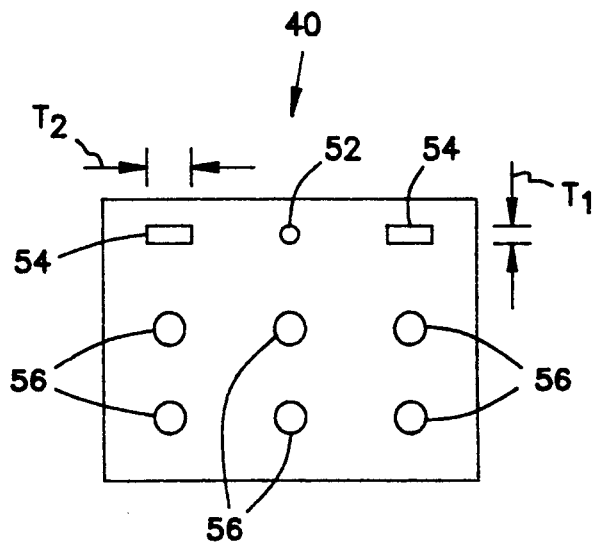
FIG. 3 is a plan view of a plate segment of the retort of the present invention.

As shown best in FIG. 3, each of the plate segments 40 includes a plurality of holes to receive the supports 50. The holes include a main support hole 52, a plurality of transverse support holes 54 and a plurality of expansion support holes 56.

Figure 4:
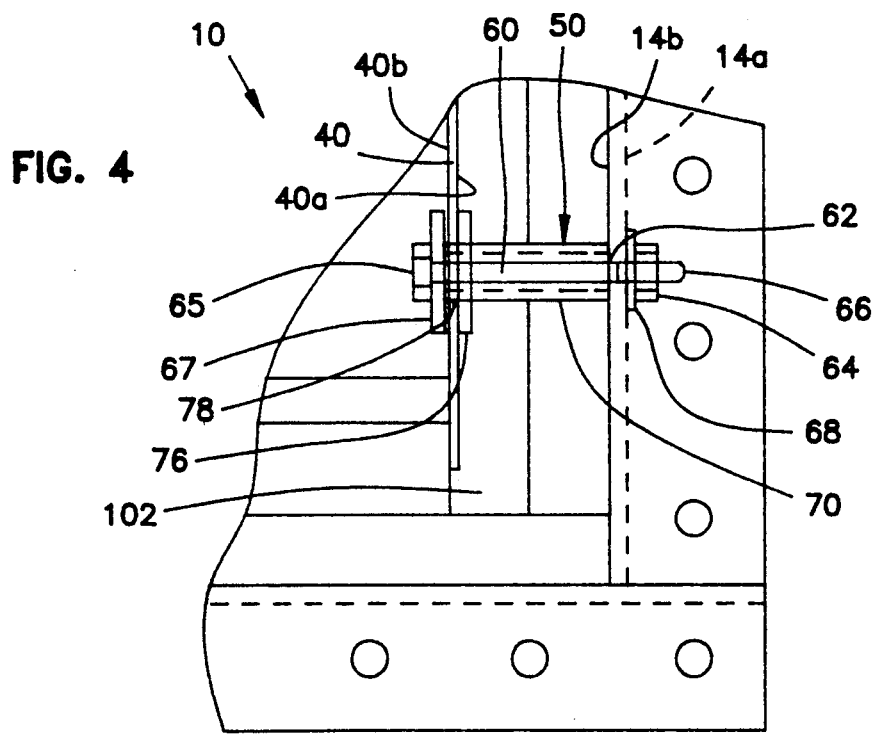
FIG. 4 is an enlarged view of the lower right hand corner of FIG. 2.

To fully appreciate the structure and function of support holes 52,54,56, attention is directed to FIG. 4 which is an enlarged view showing a support 50 within a wall 14. The support 50 includes a pin 60. Pin 60 passes through a hole 62 formed in outer wall 14a. The hole 62 is sized to be approximate to a diameter of pin 60. A threaded nut 64 is received on a threaded end 66 of pin 60 with a washer 68 placed between the nut 64 and wall 14a.

Figure 5:
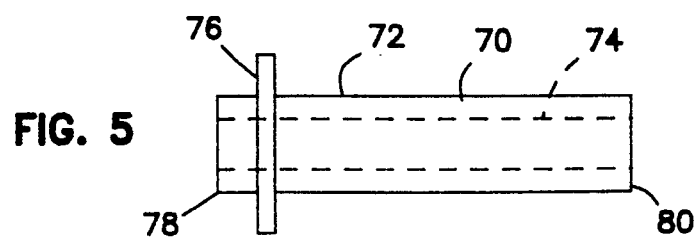
FIG. 5 is a view of a spacer for use with the present invention.

A spacer 70 (shown best in FIG. 5) is provided. The spacer 70 has a hollow cylindrical body 72 with an inner bore 74 sized to have a diameter slightly greater than the diameter of pin 60. A radial flange 76 is provided surrounding body 72 and disposed spaced between a first end 78 and a second end 80. The spacing between flange 76 and first end 80 is approximate to a desired distance between plates 40 and outer wall 14a. The distance between end 78 and flange 76 is approximate to a thickness of the plates 40.

As shown in FIG. 4, the spacer 70 surrounds pin 60 and is disposed between plate 40 and wall 14a. End 80 abuts an inner surface 14b of wall 14a. An inner surface 40a of wall segment 40 abuts flange 76.

The pin 60 has a head end 65. A washer 76 is received on the pin 60 between the head end 65 and the outer surface 40b of plate 40. Accordingly, the plate 40 rests on spacer 70 with end 78 abutting washer 76.

With best reference to FIG. 3, a plate segment 40 is shown. The main support hole 52 is sized to be approximate to the diameter of support spacer 70. The transverse support holes 54 are provided on opposite sides of hole 52 with holes 52 and 54 co-linearly aligned in a direction parallel to the longitudinal axis of the retort 10.

The transverse support holes 54 are rectangular in shape and have a longitudinal dimension, $T_2$, which is parallel to the axis. Also, the support holes have a transverse dimension, $T_1$, which is provided to be approximately equal to the diameter of the support 70. The longitudinal dimension, $T_2$, of holes 54 is substantially greater than the diameter of pin 70.

The expansion support holes 56 are circular and provided with a diameter substantially greater than the diameter of the support 70 (but smaller than the diameter of flange 76 or washer 67). The expansion support holes 56 are provided beneath the main support hole and transverse support holes 52,54. As shown in FIG. 1, a plate 40 may have one or more rows of expansion support holes 56.

By reason of the foregoing construction, during thermal expansion of a plate 40, the close tolerance between the support 70 and hole 52 prevents the plate 40 from being dislocated or moving relative to the retort outer shell. Thermal expansion of the plate 40 is permitted with holes 54 permitting the plate to expand in a transverse direction relative to pin 52. However, since the transverse dimension, $T_1$, of holes 54 is approximate to the diameter of the spacer 70, the holes 54 prevent rotational movement of the plate 40 about pin hole 52. Holes 56 permit general thermal expansion in any direction.

As shown in FIGS. 1 and 2, the segments 40 are provided in parallel overlying relation to present overlapping portions 90. During thermal expansion, the overlapping portions 90 will slide relative to one another.

With the construction thus described, a void 100 (shown in FIG. 2) is provided in the space between walls 30' and 30. The void is preferably filled with insulation material 102 (shown only in FIG. 4).

By reason of the foregoing construction, a laminated retort design is provided. The inner shell 30' of the retort is a flat surface which is a laminated section of stainless steel plates 40. The retort 10 has a flat outer shell 30 of mild steel. Refractory or insulating material 102 is sandwiched between the shells 30,30'. The various plate segments 40 provide for a modular construction so that the segments 40 can be standardized as to both length and depth. As a result, any length of fluidized bed can be constructed without substantial custom design of the retort 10.

As a result of the foregoing construction, quartz tubes or other heating elements can be clamped against the flat surface of the outer wall 12a. The various sized apertures 52,54, and 56 permit thermal expansion of the retort in a manner which does not stress the quartz tubes which would be passing through holes 24. Namely, the construction thus described permits thermal expansion while preventing rotation of the plate segments which would otherwise interfere with the alignment of quartz tubes extending through holes 24 and possibly damage the quartz tubes.

Figure 6:
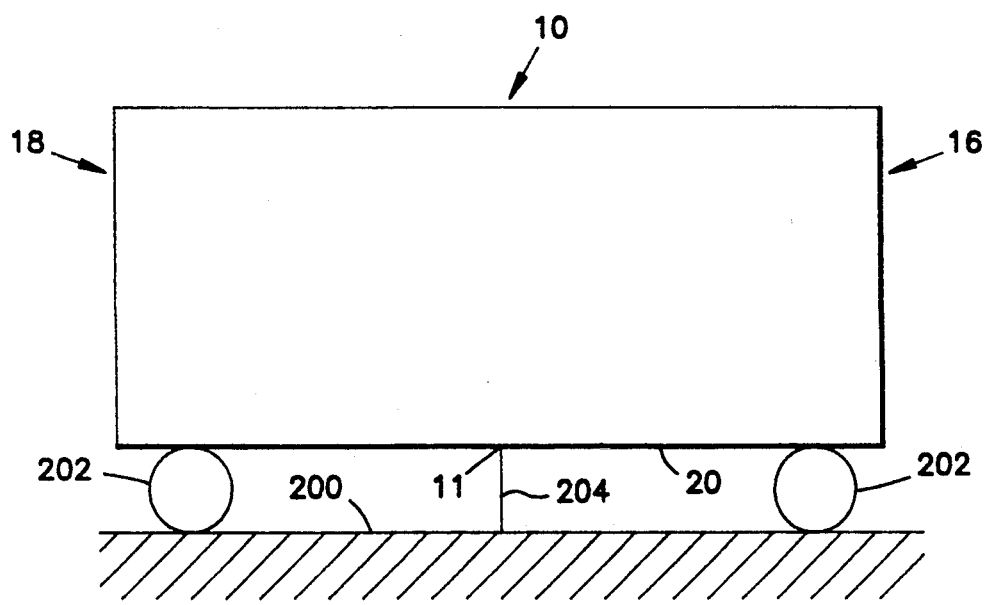
FIG. 6 is a schematic side elevation of the retort on a foundation.

With reference to FIG. 6, the retort 10 is secured with its center 11 fixed to a stationary foundation 200 by a tie member 204 as schematically illustrated in FIG. 6. The ends 16, 18 of the retort may expand and contract relative to the foundation. Any suitable means (e.g., rollers 202 schematically shown in FIG. 6) accommodate the relative movement.

From the foregoing detailed description of the present invention, it has been shown how the objects of the invention have been attained in a preferred manner. Modifications and equivalents of the disclosed concepts such as those which were readily incurred by one skilled in the art are intended to be included within the scope of the present invention.

What is claimed is:

1. A retort for a fluidized bed having a wall defining a retort interior, said wall comprising:

an outer wall having an inner side opposing said interior;

an inner wall including a plurality of plate segments;

support means for securing said plurality of plate segments to said inner side with said plate segments disposed spaced from said outer wall and with said plate segments further disposed in sliding overlapping relation whereby said plate segments cooperate to define a substantially continuous inner wall with each segment free to thermally expand and contract independent of an expansion or contraction of a contiguous plate segment; and said support means including a plurality of support rods secured to said inner side and extending therefrom, each of said plate segments secured to a plurality of said rods, said plurality including at least a first rod and a second rod each passing through a first and a second, respectively, hole formed in said plate segment, said plate supported by resting on said second rod in an unattached manner and at least said second hole sized to permit relative transverse movement of said second rod within said second hole.

2. A retort according to claim 1 comprising thermal insulation disposed between said inner and outer wall.

3. A retort according to claim 1 wherein said first hole is sized approximate to a cross-sectional dimension of said first support assembly.

4. A retort according to claim 3 wherein said support means includes a spacer surrounding said rod with said spacer slidably received on said rod and extending at least partially through said hole.

5. A retort according to claim 1 wherein said retort extends between a first end and a second end with an intermediate location disposed between said first and second ends, means for securing said intermediate location to a foundation, means for supporting said first and second ends on said foundation with said ends movable in a path of travel generally parallel to a longitudinal axis extending between said first and second ends.

6. A retort according to claim 1 wherein said support rod includes a bolt member fixed to said outer wall and a sleeve surrounding said bolt member, said second hole sized to freely pass said sleeve and accommodate unimpeded thermal expansion and contraction of said plate segment relative to said sleeve.

7. A retort according to claim 6 comprising stop means secured to said support rod and positioned to resist movement of said plate segment in a direction parallel to an axis of said support rod.

8. A retort according to claim 7 wherein said stop means includes a first flange secured to said sleeve and an opposing second flange secured to a free end of said bolt member, said plate segment disposed between said first and second flange.

9. A retort according to claim 1 comprising at least a third hole formed in said plate segment and sized to receive a quartz conduit passing through said plate segment.

* * * * *